July 1, 1930. C. R. RANEY ET AL 1,769,037
MEANS FOR NARROWING HARVESTER THRASHERS FOR TRANSPORT
Filed July 26, 1926 2 Sheets-Sheet 2
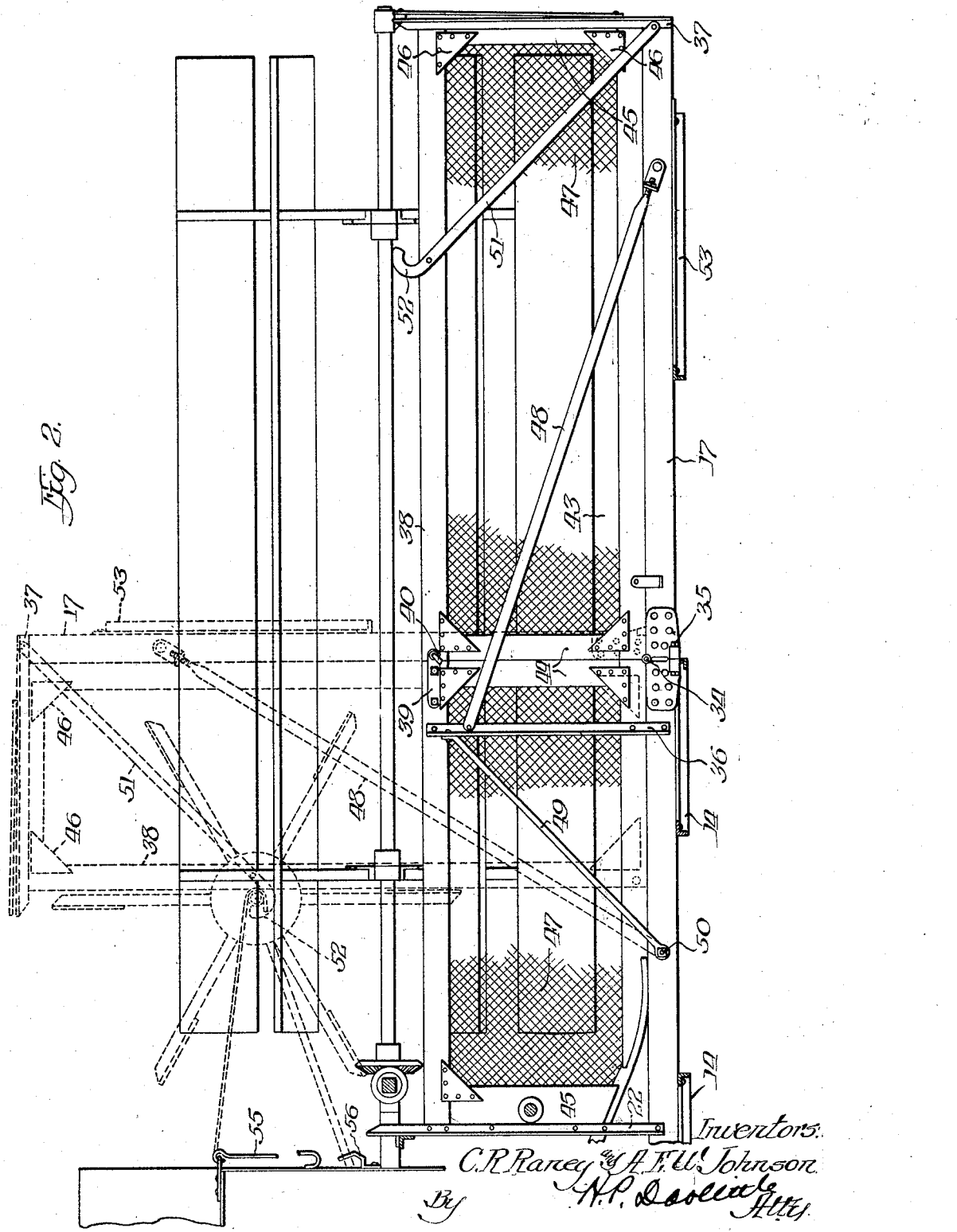

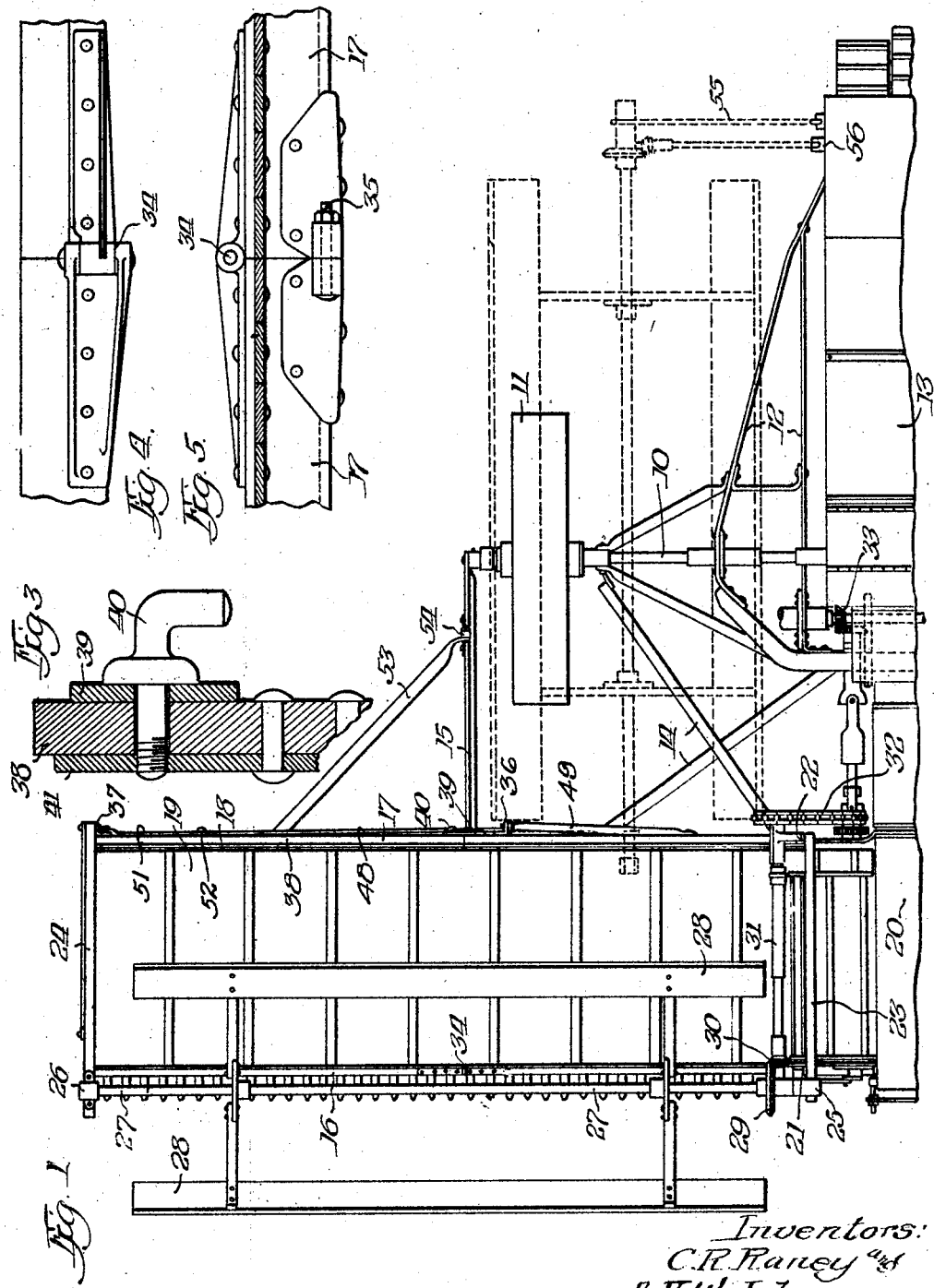

Patented July 1, 1930

1,769,037

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY

MEANS FOR NARROWING HARVESTER THRASHERS FOR TRANSPORT

Application filed July 26, 1926. Serial No. 124,991.

This invention relates to harvester thrashers and specifically to structure therefor which will permit material lessening of its lateral dimension for purposes of convenient transport through gateways and over narrow highways.

These machines, as now known in the art, comprise a wheel supported frame which carries at its front end a transversely disposed header platform and harvester reel. Longitudinally across the frame there is disposed a thrasher body. It would be very cumbersome and perhaps frequently impossible to transport these machines through narrow places and over narrow highways, because of their extreme lateral dimensions. It is advantageous, therefore, to provide mechanism for narrowing the width of these machines when it is desirable to transport the same at the times stated.

With this general statement in mind, it is the main object of this invention to provide means for temporarily narrowing the width of a machine of this kind.

Another object is to provide such a means which is practicable and easy to handle.

Other objects should be apparent as the description hereof progresses.

These very desirable objects are accomplished in a machine of this kind, wherein the reel may be bodily removed as a unit from its normal operative position. With this done, the outer end of the platform, which is hinged, may be folded upwardly and made secure in such folded position. After that, the reel is hung from the thrasher body by means carried on said body and the platform. Thus, the machine may be considerably narrowed for the purposes stated.

Looking now to the accompanying sheets of drawings, wherein the same characters of reference designate similar parts,—

Figure 1 is a plan view showing so much of a harvester thrasher as is necessary to illustrate the present invention;

Figure 2 is a rear elevational view of the platform and reel shown in Figure 1; and Figures 3, 4 and 5 are details.

As seen in Figure 1, there is shown a main axle 10, grain wheel 11, and frame 12, supporting the usual longitudinally extending thrasher body 13.

Extending forwardly from the axle 10, and pivotally connected thereto are crossed frame bars 14, and at the grainward end of the axle, there is pivotally carried another forwardly extending frame bar 15. The front ends of these bars carry the usual transverse Z-bar 16, and spaced rearwardly therefrom, these bars carry the usual parallel angle bar 17. These bars 16 and 17 conventionally carry a header platform 18 supporting a conveyer apron 19, as shown. This apron, as is usual in this art, conveys the cut grain to a feeder 20 at the front end of the thrasher body 13.

The stubbleward end of the Z-bar 16 carries an upright angle iron bar 21 and longitudinally in line therewith the bar 17 carries a similar upright bar 22. The tops of these two bars are spanned by a frame sill 23. A similar sill 24 is carried at the grainward end of the platform, as shown.

The forward ends of these sills 23, 24 are provided respectively with bearings 25 and 26 for journaling a reel shaft 27, which supports a conventional reel 28. The reel shaft carries at its stubbleward end a bevel gear 29 meshed with a gear 30 on a longitudinal, telescoped shaft 31, supported in any suitable manner, said shaft deriving rotation from the driving connections 32, shown, connected to a moving part 33 on the thrasher body 13. In this manner the reel may be driven. As these driving connections form no part of this invention, it is unnecessary to go into greater detail in this respect.

This invention contemplates the provision of means for materially lessening the lateral dimension of a harvester thrasher, for transport purposes.

Accordingly, as shown particularly well in Figures 1, 2, 4 and 5, the bars which support the header platform, to-wit, the Z-bar 16 and the angle bar 17 are each formed substantially midway of their lengths with a hinge 34, said hinge being normally locked to hold the bars as a rigid unit, by means of the locking bolts 35. These details are shown in plan in Figure 4 and in elevation in Figure 5. The rear supporting bar 17 of the platform, of course, carries the upright support 22 heretofore mentioned, and additionally carries similar uprights 36 and 37, the upright 37 being at the extreme outer end of the bar 17, as shown. Across their upper ends these uprights 22, 36 and 37 are joined by a horizontally disposed board 38, which is split intermediately of its ends directly above the breaking point of the hinge 34. The split or severing of the board 38 is made ineffective during normal operation of the machine by means comprising a strap 39 bolted to one part of the board 38 and extending across the split so that the two parts may be connected together by a detachable hand screw 40, as shown in Figure 3, in detail. It is to be observed that the screw has a threaded end engageable in a threaded aperture in a plate 41 fastened to the front side of the board 38. A similar horizontally disposed split board 43 runs across the bottoms of these uprights, the boards 38 and 43 being strengthened at that point where they are cut, by means of adjoining upright boards 44. At their opposite ends these boards are connected by other upright boards 45, the connection at the corners between all of the boards being strengthened by triangular fastening plates 46. The construction just described forms the back board or rear wall for the header platform, the same adapted to have a canvas or similar covering 47 placed thereover, so that this back board will serve as an effective wind break and prevent scattering of the grain off the header platform when traveling through a field.

A brace rod 48 connects the support 36 to the bar 17 and a similar brace rod 49 extends in an opposite direction from the upright 36 and is made fast to the bar 17 by a bolt 50. At the far outer end of this back board structure another strengthening member 51 is made fast, said member having a hook portion 52 at its upper end for a purpose hereinafter to be described. The outer end of the platform is supported by a bar 53 which, as shown in Figure 1, is made connected to the longitudinal beam 15 by means of a pivot connection 54. As shown in Figures 1 and 2, the rear grainward side of the thrasher body 13 carries a hook 55 and an apertured bracket or socket 56 for a purpose soon to appear.

When it is desired to transport the machine, it can now be seen that the outer end of the platform may be hinged upwardly, as shown in the dotted line position of Figure 2. This is accomplished by unfastening the brace 48 from the upright 36 and additionally taking out the bolts 35 and loosening the hand screw 40. The reel shaft with the reel is then removed bodily from the bearings which support the same. The telescoped shaft permits this, without disturbing the driving connections 32. It can now be appreciated that with the reel out of the way the outer end of the platform may be bodily folded upwardly on the hinges 34.

This is possible because the outer section of the wind board can be flexed forwardly a slight distance so that it will clear the inner section of the wind board to permit this folding action mentioned. The stubbleward end of the bar 48 is then made fast to the bolt 50 and thus the platform will be held securely in its upwardly folded position. The reel shaft is then hung on the hook 52 of the member 51 at its front end, and, at its rear end, as shown in the dotted line position of Figure 1, the reel shaft is supported by the hook 55 while the square telescoping part of the reel drive shaft 31 is fitted into the socket 56. In this manner the lateral width or dimension of the harvester-thrasher can be materially lessened.

From this disclosure, it can now be seen that a very simple mechanism has been provided for practically accomplishing the desirable objects of this invention, heretofore stated.

It is to be understood, of course, that only an illustrative embodiment of this invention has been shown and described, and that the same is undoubtedly susceptible of changes in construction. The intention is to cover all such changes as do not depart from the spirit and scope of this invention, as indicated in the appended claims.

What is claimed is:

1. In a harvester thrasher, the combination of a transversely disposed platform, a longitudinally disposed thrasher body, a bodily removable reel carried by the platform, hinge connections included in the platform to enable upward folding movement of a portion thereof, and hanger means on the thrasher body for carrying the reel alongside the thrasher body when the same has been removed from the platform.

2. In a harvester thrasher, the combination of a transversely disposed platform, a longitudinally disposed thrasher body, a bodily removable reel carried by the platform, hinge connections included in the platform to enable upward folding movement of the outer portion thereof, means for retaining said portion of the platform in such folded position, and hanger means for supporting the removed reel longitudinally from the body of the thrasher.

3. In a harvester thrasher, the combination of a transversely disposed platform, a longitudinally disposed thrasher body, a bodily removable reel carried by the platform, hinge connections included in the platform to enable upward folding movement of the outer portion thereof, means to secure such portion in its folded position, and hanger means for carrying the removed reel longitudinally on the grainward side of the thrasher body and to the rear of the non-folded part of the platform.

4. In a harvester-thrasher, the combination of a frame, a header platform including spaced bars carried on said frame, hinges in the bars intermediately of their ends to permit folding of the platform, and means for locking the hinges to maintain the platform in a normal operative position.

5. In a harvester-thrasher, the combination of a transversely disposed axle, forwardly extending bars pivoted to said axle and supporting a header platform, said platform having a hinged part extending laterally beyond the end of the axle, and a support for the outer end of the platform pivotally connected to one of the forwardly extending bars pivoted to the axle.

6. In a harvester-thrasher, the combination of a frame, a header platform carried thereon by spaced frame bars, hinges in the frame bars, and a wind board for the platform comprising two sections arranged with their adjoining ends in a vertical line with said hinges for the frame bars, whereby upon flexing the outer wind board section relative to the inner wind board section the outer end of the platform may be folded upwardly.

7. In a harvester-thrasher, the combination of a frame, a header platform carried thereon by spaced frame bars, hinges in the frame bars, a wind board for the platform comprising two sections arranged with their adjoining ends in a vertical line with said hinges for the frame bars, whereby upon flexing the outer wind board section relative to the inner wind board section the outer end of the platform may be folded, means for locking the wind board sections together, and means for locking the hinges for retaining the platform in its normal operative position.

8. In a harvester thrasher, the combination of a body, a transversely disposed platform, a reel mounted on the platform for bodily removal therefrom, means for hanging the reel when so removed from the body of the machine along one side thereof, and hinge connections included in the platform to enable folding movement of the outer end thereof to narrow the lateral width of the machine.

9. In a harvester thrasher, the combination of a body, a transversely disposed platform, a reel mounted on the platform for bodily removal therefrom, means for hanging the reel when so removed longitudinally from the body of the machine along its grainward side, and connections included in the platform to enable the grainward end thereof to be folded upwardly to narrow the lateral width of the machine.

10. In a harvester thrasher, the combination of a longitudinally disposed thrasher body, a transversely disposed platform, a bodily removable reel carried on the platform, means included in the platform to enable folding movement thereof, and means for carrying the removed reel alongside the thrasher body, said means comprising supports located on the platform and on the thrasher body.

11. In a harvester thrasher, the combination of a transversely disposed platform, a transversely disposed reel and reel shaft removably supported on the platform, a longitudinally disposed thrasher body, and means on the thrasher body and platform for supporting said reel and shaft when removed alongside said thrasher body.

12. In a harvester thrasher, the combination of a body, a transverse platform including means to enable folding movement thereof to narrow the lateral width of the machine, a bodily removable reel carried on the platform, means for carrying the reel when removed alongside the body of the machine, said means comprising a hook on the platform for supporting one end of the reel and a hook on the body for supporting the other end of the reel.

13. In a harvester thrasher, the combination of a longitudinally disposed thrasher body, a transversely disposed platform, connections included in the platform to adapt the outer end thereof for upward folding movement, a reel on the platform including a shaft, a second shaft geared thereto, said reel and shafts being mounted for bodily removal from the platform, hook and socket members on the thrasher body, a hook on the platform, said reel when removed adapted to be carried alongside the thrasher body by the hooks mentioned, said hooks engaging the first reel shaft, and said second shaft being engageable in the socket mentioned.

In testimony whereof we affix our signatures.

CLEMMA R. RANEY.
ARNOLD E. W. JOHNSON.